United States Patent
Rahm et al.

(10) Patent No.: US 11,608,001 B1
(45) Date of Patent: Mar. 21, 2023

(54) RETRACTING STEP SYSTEM

(71) Applicant: Cottrell, Inc., Gainesville, GA (US)

(72) Inventors: Matt Rahm, Buford, GA (US); Steven Thomas Sexton, Lawrenceville, GA (US); Gerard Biagi, Sugar Hill, GA (US)

(73) Assignee: Cottrell Incorporated, Gainesville, GA (US)

( * ) Notice: Subject to any disclaimer, the term of this patent is extended or adjusted under 35 U.S.C. 154(b) by 0 days.

(21) Appl. No.: 17/684,365

(22) Filed: Mar. 1, 2022

Related U.S. Application Data

(63) Continuation of application No. 16/919,772, filed on Jul. 2, 2020, now Pat. No. 11,292,392, which is a continuation-in-part of application No. 16/707,388, filed on Dec. 9, 2019, now abandoned.

(60) Provisional application No. 62/776,897, filed on Dec. 7, 2018.

(51) Int. Cl.
*B60R 3/02* (2006.01)
(52) U.S. Cl.
CPC ..................... *B60R 3/02* (2013.01)

(58) Field of Classification Search
CPC ........................................ B60R 3/02
See application file for complete search history.

(56) References Cited

U.S. PATENT DOCUMENTS

| | | | | |
|---|---|---|---|---|
| 1,007,591 | A | 8/1850 | Burdett | |
| 1,129,956 | A * | 3/1915 | Chapman | B60R 3/02 105/449 |
| 6,663,125 | B1 * | 12/2003 | Cheng | B60R 3/02 280/760 |
| 7,168,722 | B1 * | 1/2007 | Piotrowski | B60R 3/02 280/166 |

* cited by examiner

*Primary Examiner* — Bryan A Evans
(74) *Attorney, Agent, or Firm* — Smith Tempel Blaha LLC; Matthew T. Hoots

(57) ABSTRACT

An automatically extending and retracting step system according to the solution may reside in a retracted state when the deck of a car-carrying vehicle is substantially horizontal to the ground, i.e. when the deck is in a payload state. Advantageously, when the deck is tilted and extended to a ramp state for receiving cargo, the step system according to the solution extends laterally outward from beneath the deck, thereby providing a convenient and visible step for a user to use in getting down from the deck. When the deck is returned from the ramp state to its payload state, the step automatically retracts to a travel state beneath the deck.

10 Claims, 3 Drawing Sheets

RETRACTING STEP SYSTEM

PRIORITY AND RELATED APPLICATIONS STATEMENT

This application is a continuation of U.S. non-provisional application entitled "RETRACTING STEP SYSTEM", filed Jul. 2, 2020 and assigned application Ser. No. 16/919,772, which is a continuation-in-part of the U.S. non-provisional application entitled "RETRACTING STEP SYSTEM", filed on Dec. 9, 2019 and assigned application Ser. No. 16/707,388, which claimed priority under 35 U.S.C. § 119(e) to U.S. provisional application entitled "RATCHET DEVICE AND RETRACTING STEP SYSTEM," filed on Dec. 7, 2018 and assigned application Ser. No. 62/776,897. The entire contents of application Ser. Nos. 16/919,772 and 16/707,388 and 62/776,897 are hereby incorporated by reference.

BACKGROUND

A single-car or multi-car flatbed or rollback vehicle (a "car-carrying vehicle") often presents a user with no efficient or convenient way to physically climb onto, or off of, its deck. As one of ordinary skill in the art of car-carrying vehicles would understand, the deck of a car-carrying vehicle may be configured to transition between a substantially level state for carrying cargo and a tilted, extended state for receiving cargo. The deck may be hydraulically transitioned between the level state and the tilted state, as would be understood by one of ordinary skill and experience with car-carrying vehicles.

To load cargo (such as an automobile) onto the deck of a car-carrying vehicle, the deck may be tilted upward and then extended downward toward the ground. The cargo, such as an automobile, may then be driven onto the deck. Subsequently, the user who drove the automobile onto the deck would have to exit the automobile and dismount from the deck.

And so, there is a need in the art for a system that may provide a user of a car-carrying vehicle with a step for ease of climbing down off of, or up onto, the deck of the car-carrying vehicle when it's in a tilted state. More specifically, there is a need in the art for a retracting step system that automatically extends a step beyond the side of a car-carrying vehicle when the deck is in a tilted state and returns the step to a retracted position beneath the car-carrying vehicle when the deck is in a level state for carrying cargo.

SUMMARY

The present solutions relate to an automatically extending and retracting step system. Embodiments of the solution may be integrated into a single-car or multi-car flatbed or rollback vehicle (a "car-carrying vehicle"), although other applications are envisioned. Exemplary embodiments of an automatically extending and retracting step system reside in a retracted state when the deck of a car-carrying vehicle is substantially horizontal to the ground, i.e. when the deck is in a payload state. Advantageously, when the deck is tilted and extended to a ramp state for receiving cargo, the step system according to the solution extends laterally outward from beneath the deck, thereby providing a convenient and visible step for a user to use in getting down from the deck. When the deck is returned from the ramp state to its payload state, the step automatically retracts to a travel state beneath the deck.

A non-limiting embodiment of an automatically extending and retracting step system according to the solution may be mounted beneath the cargo deck of a car-carrying vehicle that is operable to translate the cargo deck between a substantially level state for carrying cargo and a tilted/extended state for receiving cargo. The exemplary embodiment comprises a step carriage mounted to a chassis of the car-carrying vehicle, a step slidably mounted within the step carriage, a linkage plate, a rotatable actuation lever mounted to the chassis of the car-carrying vehicle and the linkage plate, a spring mounted to the chassis of the car-carrying vehicle and the linkage plate, and a push bar connecting the step to the linkage plate. An actuating force applied to the rotatable actuation lever operates to extend at least a portion of the step from the step carriage. The step carriage may be positioned such that extending the step from the carriage extends the step portion toward a side of the car-carrying vehicle. The actuating force may be applied to the rotatable actuation lever via a sliding channel beam comprised within the superstructure of the cargo deck. Removal of the actuating force allows for a pulling force generated by the spring to retract the step into the step carriage.

BRIEF DESCRIPTION OF THE DRAWINGS

In the figures, like reference numerals refer to like parts throughout the various views unless otherwise indicated. For reference numerals with letter character designations such as "121A" or "121B," the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The present solution relates to an automatically extending and retracting step system. Embodiments of the solution may be integrated into a single-car or multi-car flatbed or rollback vehicle (a "car-carrying vehicle"), although other applications are envisioned. Exemplary embodiments of an automatically extending and retracting step system reside in a retracted state when the deck of a car-carrying vehicle is substantially horizontal to the ground, i.e. when the deck is in a payload state. Advantageously, when the deck is tilted and extended to a ramp state for receiving cargo, the step system according to the solution extends laterally outward from beneath the deck, thereby providing a convenient and visible step for a user to use in getting down from the deck. When the deck is returned from the ramp state to its payload state, the step automatically retracts to a travel state beneath the deck.

Generally, when the automatically extending and retracting step system is in a retracted state, the step is completely received within a step carriage. It is envisioned that when used in an application for a car-carrying vehicle, the step may be retained beneath the deck of the car-carrying vehicle. A spring component ensures that the normal state of the system is for the step to be retracted. The spring component is anchored to the chassis of the car-carrying vehicle and exerts a pulling force on an adjustable length rod or bar that, in turn, pulls the step into the step carriage. Advantageously, when the deck of the car-carrying vehicle is tilted and extended toward the ground for receiving cargo (e.g., an automobile), a portion of the deck may engage with a lever of the system, thereby causing the lever to turn counterclockwise and push the rod via a linkage mechanism. The step, in turn, is pushed outward by the rod and extends from its step carriage such that it becomes available for use.

Notably, the description of the exemplary embodiment of the solution that follows makes use of directional terms such as "clockwise" and "counterclockwise" and "outward" and "inward" and "lowered" and the like, in order to orient the reader for ease of review and understanding of the figures. Use of these directional terms will not limit the scope of the solution or otherwise suggest that embodiments of the solution must have components that are restricted to a specific directional movement. Rather, it is envisioned that other embodiments of the solution may be configured, or oriented in application, for different directional movements than those that are shown and described herein in reference to the exemplary embodiment.

Embodiments of the retracting step system solution will become better understood from a review of the attached figures and the following description.

Figure 1:
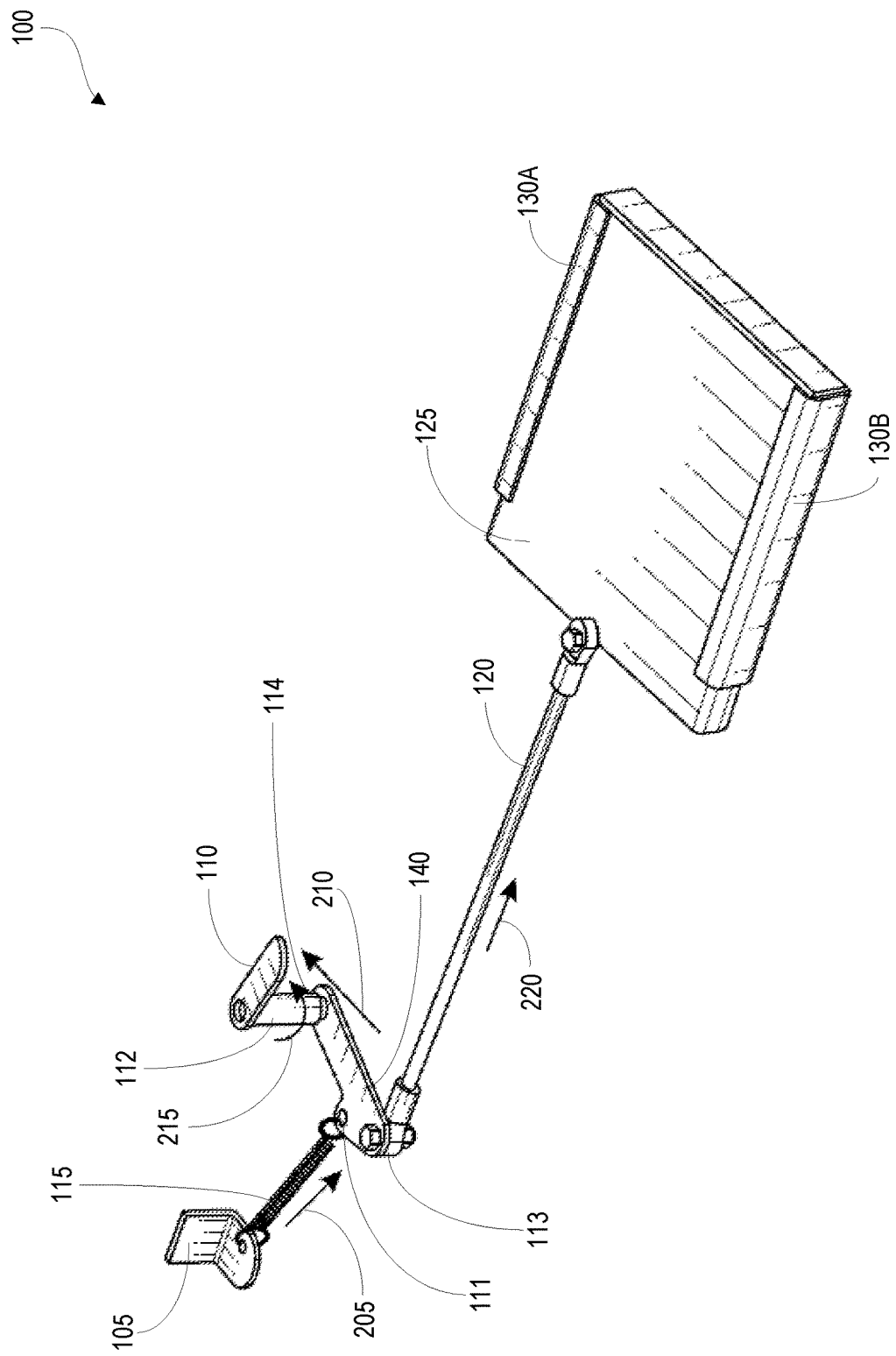
FIG. 1 illustrates an exemplary embodiment of an automatically extending and retracting step system, shown in a retracted state.
Figure 2:
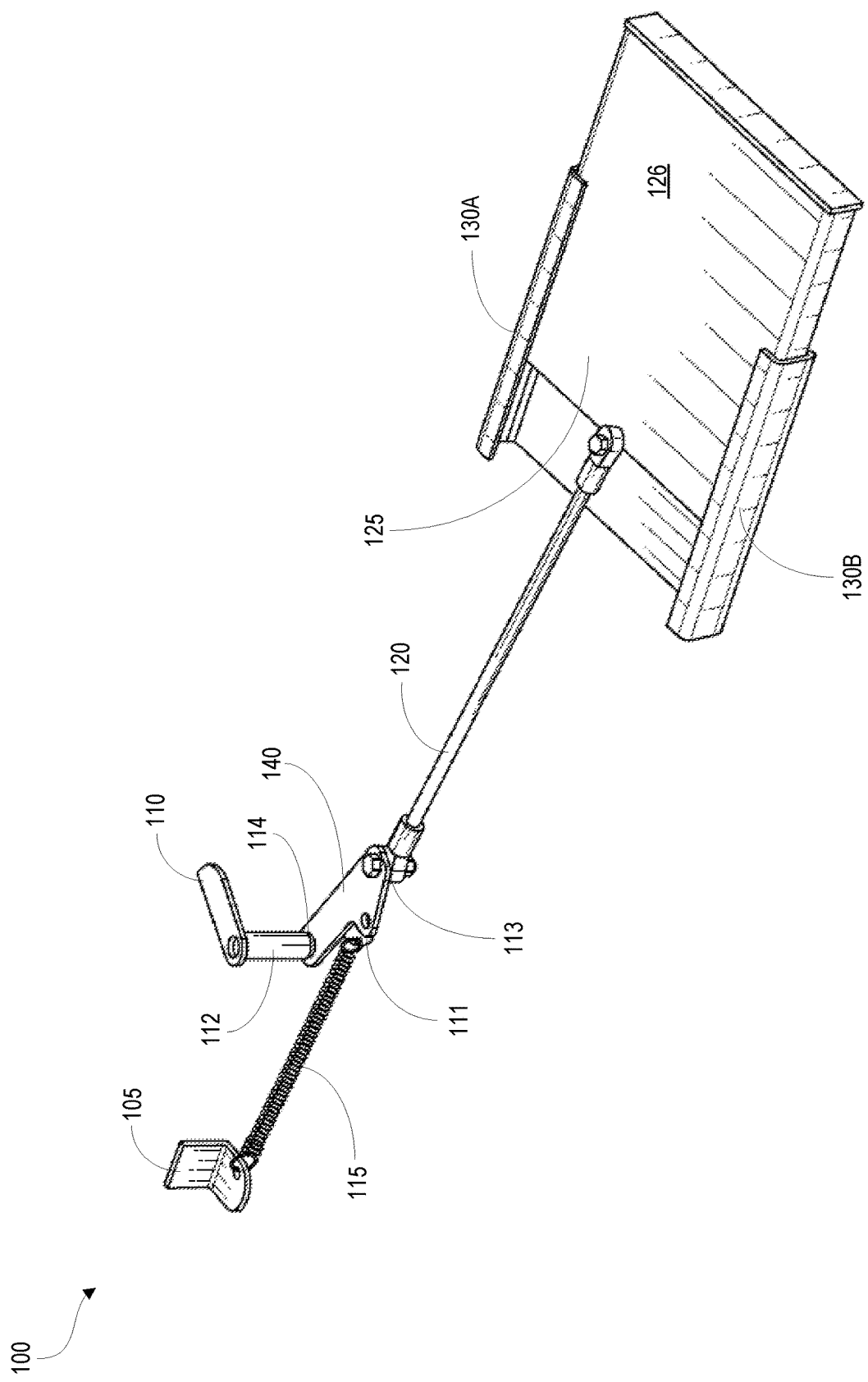
FIG. 2 illustrates the FIG. 1 exemplary embodiment of an automatically extending and retracting step system, shown in an extended state.

FIG. 1 illustrates an exemplary embodiment of an automatically extending and retracting step system 100, shown in a retracted state. The illustration includes directional force arrow 210 and directional arrows 205, 215 and 220. As will become better understood from subsequent figures and description, when a force 210 is applied to actuation lever 110, the actuation lever 110 rotates according to directional arrow 215 and, in turn, spring 115 extends according to directional arrow 205 and adjustable bar 120 translates position along directional arrow 220. The result is that step 125 extends outward from its retracted state in step carriage structure 130, thereby taking an extended state (see FIG. 2 illustration). It is envisioned that step 125 may be constructed from any suitable material including, but not limited to, aluminum, stainless steel, carbon steel, plastic, etc. It is also envisioned that step 125 may include a non-slip surface.

The exemplary embodiment of an automatically extending and retracting step system 100 includes an anchor component 105 that may be mounted to a portion of the chassis or superstructure beneath the deck of a car-carrying vehicle, for example. As one of ordinary skill in the art of car-carrying vehicles would recognize, the deck upon which cargo may be carried may be operable to tilt up and slide toward the ground in order to take the form of a ramp and receive cargo. Once cargo (an automobile, for example) has been transferred onto the deck, the deck may then retract away from the ground as it levels from the tilted position. Advantageously, when the deck is in a level position the step of an automatically extending and retracting step system may be safely in a retracted state beneath the deck and, when the deck is in a position that is tilted and extended toward the ground, the step of an automatically extending and retracting step system may be extended outward from beneath the deck.

Figure 3:
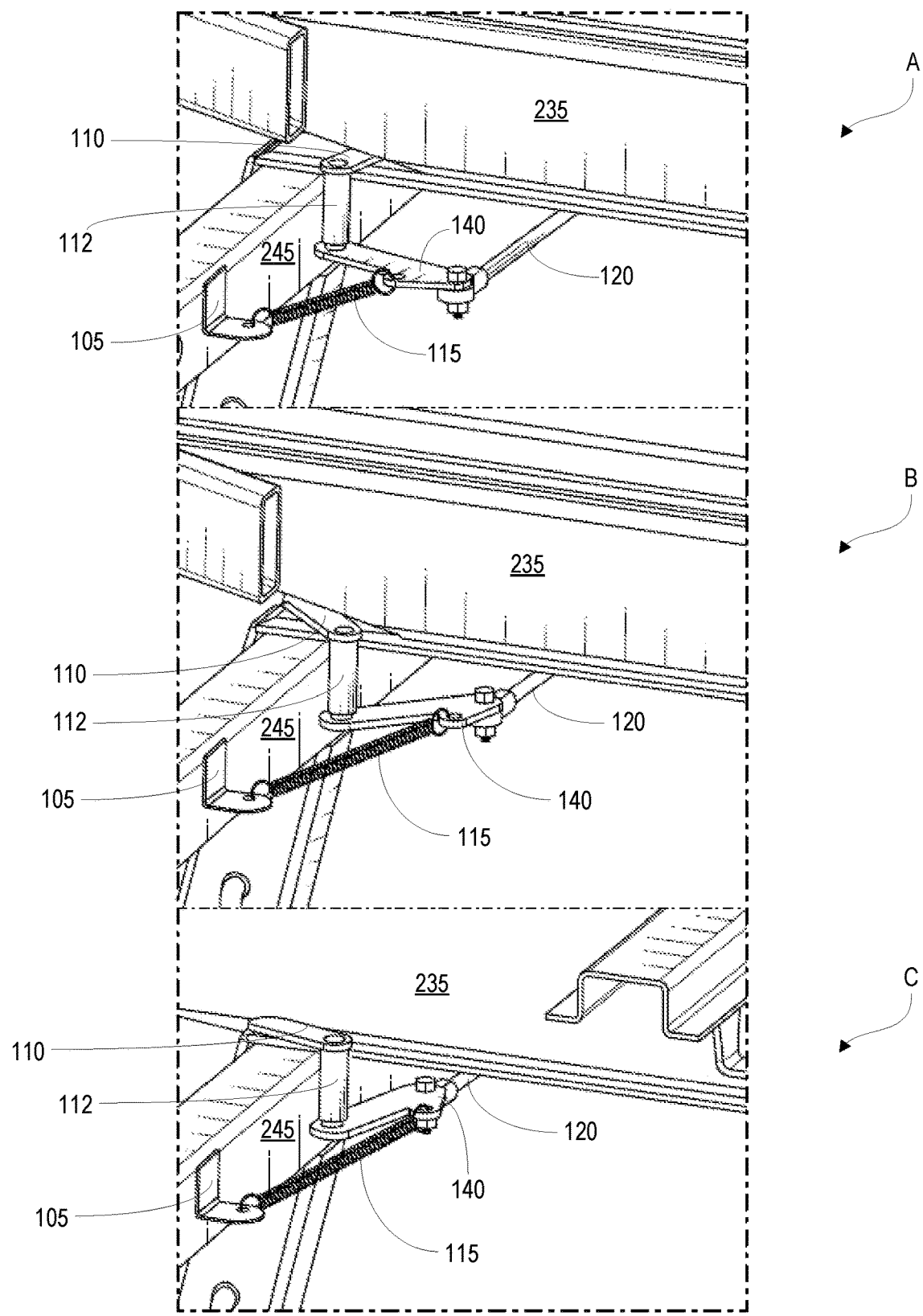
FIG. 3 illustrates the FIG. 1 exemplary embodiment of an automatically extending and retracting step system, shown mounted beneath the deck of a car-carrying vehicle and transitioning from a fully retracted state to a fully extended state.

Returning to the FIG. 1 illustration, the anchor component 105 may be fixed to a cross beam of the chassis or superstructure beneath the deck of a car-carrying vehicle (see, for example, FIG. 3). The cross beam may be substantially perpendicular to a channel beam configured for guiding the deck of the car-carrying vehicle as it is translated between its level position and its tilted/extended position. An extension spring 115 connects the anchor component 105 to a linkage plate 140 at anchor point 111. The linkage plate 140 comprises a spring anchor point 111 for receiving the extension spring 115, actuation lever anchor point 114 for fixedly mounting a vertical post component 112 that supports actuation lever 110, and hinge point 113 for receiving a first end of the push bar 120. Notably, vertical post component 112 may extend through actuation lever anchor point 114 to be rotatably mounted to the chassis or undercarriage of the car-carrying vehicle.

The push bar 120 may be adjustable in length in some embodiments. At a second end of the push bar 120 distal to the linkage plate 140, the push bar 120 may be mechanically connected to a step 125. The step 125 may be positioned within, and supported by, a pair of step carriage channels 130A, 130B (it is envisioned that in an alternate embodiment the step carriage channels 130A, 130B may be formed by a single channel with a bottom surface and a pair of vertical sides extending up from the bottom surface). As can be understood from the illustration of the exemplary embodiment in FIG. 1, the step 125 may be substantially rectilinear in shape and configured to "ride" and/or "slide" within channels defined by step carriage channels 130. It is envisioned that certain embodiments of the solution may include bearings positioned between channels 130A, 130B and the step 125 in order to facilitate smooth extension and retraction of the step 125.

With actuation lever 110 in its normal, non-actuated position (as shown in FIG. 1), the extension spring 115 may be in its initial state such that it provides a pulling force on linkage plate 140 such that plate 140 is "pulled back" toward anchor component 105 that, in turn, "pulls back" push bar 120 to retract step 125 into step carriage channels 130. Advantageously, when the step 125 is fully retracted into step carriage channels 130, it may be beneath the leveled deck of a car-carrying vehicle and unavailable for practical use. Tension in the spring 115 will cause the step system to tend to stay in the retracted position. The step carriage 130 may be fixedly mounted beneath the deck of a car-carrying vehicle on the chassis or superstructure.

FIG. 2 illustrates the FIG. 1 exemplary embodiment of an automatically extending and retracting step system 100, shown in an extended state. As can be understood from the FIG. 2 illustration, directional force 210 may have caused actuation lever 110 to rotate in a counterclockwise direction. In turn, linkage plate 140 may have also rotated such that extension spring 115 is stretched and push bar 120 is extended away from anchor component 105. With push bar 120 extended, step 125 may partially extend from step carriage channels 130 to expose step portion 126 beyond the side of a car-carrying vehicle deck. Advantageously, with step portion 126 extended laterally to the outside of the car-carrying vehicle deck, a user may access step portion 126 for climbing onto, or down from, the deck. Removing the directional force 210 from actuation lever 110 will enable extension spring 115 to return to its initial state and, in doing so, cause step 125 to fully retract into step carriage channels 130 (as shown in FIG. 1).

FIG. 3 illustrates the FIG. 1 exemplary embodiment of an automatically extending and retracting step system 100, shown mounted beneath the deck of a car-carrying vehicle and transitioning from a fully retracted state to a fully extended state. The FIG. 3 illustration is depicted in three stages, stages A-C, wherein stage A is associated with the deck of the car-carrying vehicle in a level payload state, stage C is associated with the deck of the car-carrying vehicle in a tilted and extended ramp state, and stage B is associated with the deck of the car-carrying vehicle in a state of transition between stages A and C.

Consistent with that which has been described above, it can be seen in the FIG. 3 illustration that the anchor component 105 is mounted to a cross beam 245 that is a part of the chassis beneath the deck of a car-carrying vehicle. The vertical post component 112 may also be mounted to cross beam 245 by and through actuation lever anchor point 114.

Referring to stage A of the illustration, a channel beam 235 that supports the deck of the car-carrying vehicle (deck not shown in the illustrations) may be retracted such that it is not engaging actuation lever 110. With actuation lever 110 not engaged by channel beam 235, extension spring 115 may be in its initial state and, consequently, push bar 120 retracted such that step 125 is substantially contained within step carriage channels 130 (see FIG. 1 illustration).

Referring to stage B of the illustration, the deck of the car-carrying vehicle may be in a transition from its level position for carrying cargo to its tilted and extended position for loading cargo. With the deck in transition, channel beam 235 may have been slid backward thereby engaging actuation lever 110 to apply a directional force 210 (see FIG. 1 illustration). With channel beam 235 causing rotation of actuation lever 110, it can be seen in stage B of the FIG. 3 illustration that push bar 120 is extending outward in a direction substantially perpendicular to channel beam 235. Consequently, step 125 may be extending outward from step carriage channels 130, as previously described.

Referring to stage C of the illustration, channel beam 235 has fully engaged actuation lever 110 such that actuation lever 110 has rotated counterclockwise. Stage C of the illustration may be associated with the deck of a car-carrying vehicle in a tilted and extended state ready for receipt of cargo. The push bar 120 is rotated away from anchor component 105, the extension spring 115 is stretched, and step 125 is fully extended from step carriage channels 130 to expose step portion 126, as previously described.

Retraction of the channel beam 235 such that the deck is returned to a level position for transport of cargo will disengage actuation lever 110 such that extension spring 115 may cause push bar 120 to pull step 125 back into a retracted state within step carriage channels 130, as previously described.

Systems, devices and methods for an automatically extending and retracting step have been described using detailed descriptions and drawings of an embodiment thereof that is provided by way of example and is not intended to limit the scope of the disclosure. The described embodiment comprises different features, not all of which are required in all embodiments of the solution disclosed. Some embodiments of the solution utilize only some of the features or possible combinations of the features disclosed herein. Variations of the embodiment of the solution that is described and embodiments of the solution comprising different combinations of features noted in the described embodiment will occur to persons of the art. For example, the exemplary spring illustrated and described in the exemplary embodiments is of an extension type, although it is envisioned that other spring types such as, but not limited to, torsion springs or compression springs, may be leveraged in alternative embodiments of the solution to accomplish the same functionality and, therefore, are within the scope of the solution. And so, it will be appreciated by persons skilled in the art that systems, devices and methods for an automatically extending and retracting step are not limited by what has been particularly shown and described herein above.

What is claimed is:

1. An automatically extending and retracting step system mounted beneath the cargo deck of a car-carrying vehicle that is operable to translate the cargo deck between a substantially level payload state for carrying cargo and a tilted/extended ramp state for receiving cargo, the system comprising:
    a step carriage mounted to a chassis of the car-carrying vehicle;
    a step slidably mounted within the step carriage; and
    a rotatable actuation lever mounted to the chassis of the car-carrying vehicle and the step;
    wherein when the cargo deck is transitioned to the tilted/extended ramp state, an actuating force is applied to the rotatable actuation lever such that the step is slidably extended from the step carriage; and
    wherein when the cargo deck is transitioned to the payload state, the actuating force is removed such that the step is slidably retracted into the step carriage.

2. The automatically extending and retracting step system of claim 1, wherein the step is configured to slidably extend from the step carriage toward a side of the car-carrying vehicle.

3. The automatically extending and retracting step system of claim 1, wherein the step is configured to slidably retract into the step carriage by an opposing force generated by a spring.

4. The automatically extending and retracting step system of claim 1, wherein the step comprises a non-slip surface.

5. The automatically extending and retracting step system of claim 1, wherein the step is constructed from one or more of aluminum, stainless steel, carbon steel, and plastic.

6. An automatically extending and retracting step system mounted beneath the cargo deck of a car-carrying vehicle that is operable to translate the cargo deck between a substantially level payload state for carrying cargo and a tilted/extended ramp state for receiving cargo, the system comprising:
    a pair of retracting step subsystems, each of the retracting step subsystems associated with a given side of the car-carrying vehicle and comprising:
        a step carriage mounted to a chassis of the car-carrying vehicle;
        a step slidably mounted within the step carriage; and
        a rotatable actuation lever mounted to the chassis of the car-carrying vehicle and the step;
        wherein when the cargo deck is transitioned to the tilted/extended ramp state, an actuating force is applied to the rotatable actuation lever such that the step is slidably extended from the step carriage; and
        wherein when the cargo deck is transitioned to the payload state, the actuating force is removed such that the step is slidably retracted into the step carriage.

7. The automatically extending and retracting step system of claim 6, wherein for each of the pair of retracting step subsystems the step is configured to slidably extend from the step carriage toward a side of the car-carrying vehicle.

8. The automatically extending and retracting step system of claim 7, wherein for each of the pair of retracting step subsystems the step is configured to slidably retract into the step carriage by an opposing force generated by a spring.

9. The automatically extending and retracting step system of claim 7, wherein for each of the pair of retracting step subsystems the step comprises a non-slip surface.

10. The automatically extending and retracting step system of claim 7, wherein for each of the pair of retracting step subsystems the step is constructed from one or more of aluminum, stainless steel, carbon steel, and plastic.

\* \* \* \* \*